No. 698,782. Patented Apr. 29, 1902.
H. N. BACKUS.
ANIMAL CRATE.
(Application filed May 18, 1899.)
(No Model.)
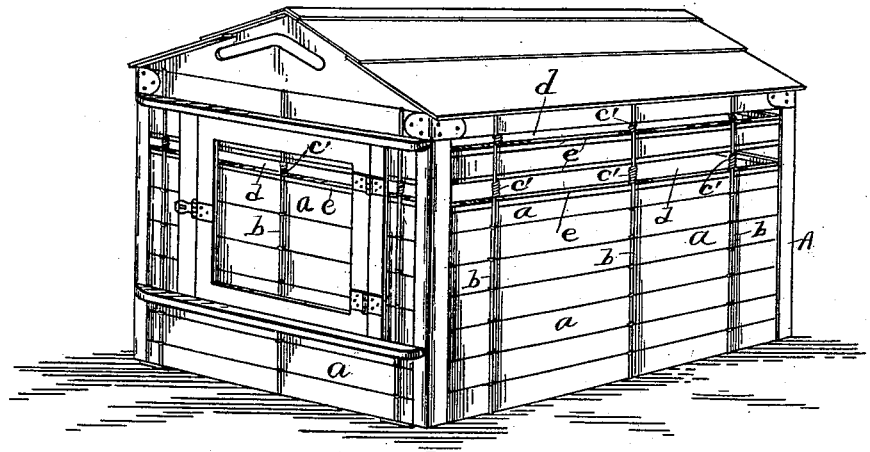
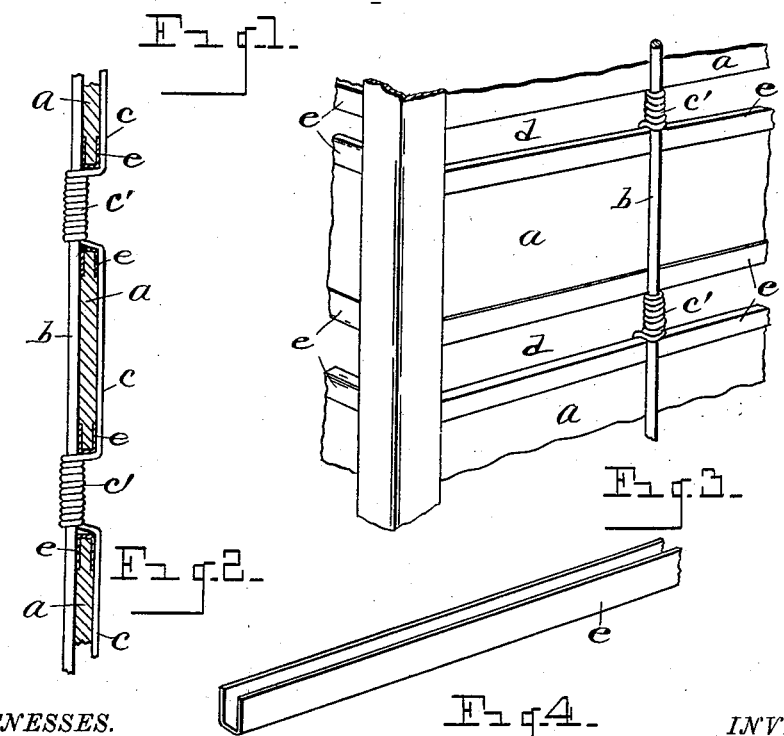
WITNESSES.
INVENTOR.
Attorneys.

UNITED STATES PATENT OFFICE.

HENRY N. BACKUS, OF DETROIT, MICHIGAN.

ANIMAL-CRATE.

SPECIFICATION forming part of Letters Patent No. 698,782, dated April 29, 1902.

Application filed May 18, 1899. Serial No. 717,242. (No model.)

*To all whom it may concern:*

Be it known that I, HENRY N. BACKUS, a citizen of the United States, residing at Detroit, in the county of Wayne, State of Michigan, have invented certain new and useful Improvements in Animal-Crates; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to animal houses or crates especially designed for shipping fine dogs and other valuable animals; and it consists in the construction and arrangement of parts hereinafter fully set forth, and pointed out particularly in the claims.

The object of the invention is to provide a transporting-crate adapted to securely confine the animal to be shipped and in which the arrangement is such as to render the crate light and strong and at the same time provide for a proper ventilation, the ventilating-openings being so protected as to prevent rodent animals from gnawing their way out or destroying the slats of the crate. This object is attained by the construction and association of parts illustrated in the accompanying drawings, in which—

Figure 1 is a perspective view of a crate embodying my invention. Fig. 2 is an enlarged sectional view in detail through the slats bordering on the ventilating-openings in the crate, showing the metal margins for protecting the edges of the slats and the confining-wires for retaining them in place. Fig. 3 is an enlarged perspective view in detail of a portion of the crate. Fig. 4 is a perspective view of one of the metal trough-shaped strips which embrace the edges of the slats of the crate bordering on the ventilating-openings therein.

It has been found in shipping dogs and other valuable animals that the crates in which they are shipped must be provided with means for ventilation, so as to permit of a free circulation of air through the crate to insure the health of the animal contained therein.

The making of an opening in the crate sufficient to afford ventilation leaves a space sufficiently large to permit a dog or rodent animal to attack with its teeth the margins of said openings formed by the slats of the crate and gnaw said slats in a manner to greatly disfigure and weaken the crate. In my improved crate I obviate the possibility of the animal gnawing the margins of the ventilating-openings by binding or covering the marginal edges of said openings formed between the slats of the crate with strips of metal in the manner shown.

Referring to the letters of reference, A designates the body of the crate, which is formed of a series of slats $a$, running horizontally of the crate across its sides and ends and which are confined in place by the vertical wires $b$, which cross said slats, and the binding-wires $c$, which embrace the slats and are wound around said vertical wires. In forming the lower portion of the walls of the crate the slats are placed edge to edge. To provide for ventilating the crate, said slats are separated at the top of the walls of the crate, so as to form between them the ventilating-spaces $d$. To protect the edges of the slats $a$, between which said ventilating-spaces are formed, said slats are provided with a marginal binding of metal $e$, which is in the shape of a trough and embraces the edges of the slats, as clearly shown in Figs. 3 and 4. Said margin of metal is securely rolled onto the edges of said slats and is retained in place by the wire $c$, which embraces the slats of the crate and is wound upon the vertical wires $b$ at the open spaces between said slats, as shown at $c'$, in such manner as to hold said slats spaced the proper distance apart and securely retain in place the metal strips which embrace the margins of said slats, as clearly shown in Fig. 2. This binding of metal placed upon the margins of the slats which border upon the ventilating-openings $d$ in the crate securely protect the edges of said slats from attack by the teeth of an animal, thereby preventing said slats from being gnawed through and destroyed. At the same time said metal bindings, embracing the marginal edges of the slats as they do, prevent said slats from becoming slivered and roughened by use, thereby materially adding to the durability and appearance of the crate.

It will be seen that the ventilating-openings extend around the crate, through all of the walls thereof and through the door, so as to afford perfect circulation of air, thereby preventing the air within the crate from becoming foul.

While I have shown and described a trough-shaped metal strip adapted to embrace the edges of the slats bordering upon the ventilating-openings, I do not wish to limit myself to that precise construction, as it is evident that other forms of marginal metallic strips may be employed to guard the ventilating-openings without departing from the spirit of my invention.

Having thus fully set forth this invention, what I claim is—

1. An article of manufacture, comprising an animal-crate having a wall of horizontal slats placed contiguously edge to edge forming a solid bottom, or lower portion of said wall, but spaced at the top to form horizontal ventilating-openings, straight transverse wires crossing the exterior of said slats, metal guards embracing the edges and extending onto the sides of the slats bordering said ventilating-openings, binding-wires embracing said slats and wound around said transverse wires between the spaced slats so as to become interposed between the metal guards for confining said guards to said slats and maintaining the slats properly spaced.

2. An article of manufacture comprising an animal-crate, having a wall of slats placed edge to edge to form a solid portion at the bottom of said wall but spaced at the top of the wall to form ventilating-openings, transverse strands crossing said slats, metal guards embracing the edges and extending onto the sides of the slats bordering the ventilating-openings, binding-strands embracing said slats and said metal guards to bind them together, spacing members interposed between the metal guards at the ventilating-openings to confine the guards in position and to properly space the slats to form said openings.

In testimony whereof I sign this specification in the presence of two witnesses.

HENRY N. BACKUS.

Witnesses:
EDGAR S. WHEELER,
M. A. MARTIN.